(12) United States Patent
Wheatley

(10) Patent No.: US 7,923,088 B2
(45) Date of Patent: *Apr. 12, 2011

(54) FRICTIONAL HOLDING PAD

(75) Inventor: Alan J. Wheatley, Draper, UT (US)

(73) Assignee: American Covers, Inc., Bluffdale, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/205,059

(22) Filed: Sep. 5, 2008

(65) Prior Publication Data

US 2009/0004420 A1   Jan. 1, 2009

Related U.S. Application Data

(60) Continuation of application No. 11/264,669, filed on Oct. 31, 2005, which is a continuation-in-part of application No. 11/021,560, filed on Dec. 22, 2004, now Pat. No. 7,252,867, which is a continuation-in-part of application No. 10/684,008, filed on Oct. 10, 2003, now Pat. No. 7,125,602, which is a division of application No. 10/209,948, filed on Jul. 30, 2002, now Pat. No. 6,673,409.

(60) Provisional application No. 60/308,955, filed on Jul. 31, 2001, provisional application No. 60/344,571, filed on Dec. 28, 2001.

(51) Int. Cl.
*B32B 3/30* (2006.01)

(52) U.S. Cl. ........... 428/40.1; 428/41.3; 428/41.5; 428/42.1; 428/156; 428/160; 428/192; 428/194; 428/922

(58) Field of Classification Search .................. None
See application file for complete search history.

(56) References Cited

U.S. PATENT DOCUMENTS 2,128,118 A   8/1938   Burford
2,466,502 A   4/1949   Stiller
(Continued)

FOREIGN PATENT DOCUMENTS

WO   WO 02/35975   5/2002
(Continued)

OTHER PUBLICATIONS

Wheatley, U.S. Appl. No. 11/264,669, filed Oct. 31, 2005, office action issued Mar. 18, 2009.
(Continued)

*Primary Examiner* — Callie E Shosho
*Assistant Examiner* — Cheng Huang
(74) *Attorney, Agent, or Firm* — Thorpe North & Western LLP

(57) ABSTRACT

A frictional holding pad for removably attaching items, such as a cell phone or sunglasses, to a vehicle surface, such as a dash or console, to allow storage of items on the pad to prevent the items from shifting or sliding due to the movement of the vehicle. The holding pad includes a top surface having an uppermost contact surface configured to contact and frictionally cling to the item and a bottom surface having a lowermost contact surface configured to contact and frictionally cling to the vehicle surface. The top and the bottom surfaces are configured to provide a greater frictional engagement between the lowermost contact surface and the vehicle surface than the uppermost contact surface and the item. Protrusions or indentation can be formed in the top and bottom surfaces of the pad.

19 Claims, 5 Drawing Sheets

U.S. PATENT DOCUMENTS

| | | | |
|---|---|---|---|
| 2,642,248 | A | 6/1953 | Semon |
| 3,654,047 | A | 4/1972 | Berkowitz |
| 4,749,222 | A | 6/1988 | Idland |
| 4,862,944 | A | 9/1989 | Hendreshot |
| 4,944,311 | A | 7/1990 | Eldridge, Jr. et al. |
| 4,986,496 | A | 1/1991 | Marentic et al. |
| 5,036,866 | A | 8/1991 | Eldrige, Jr. et al. |
| 5,358,094 | A | 10/1994 | Molinaro |
| 5,508,084 | A | 4/1996 | Reeves et al. |
| 5,599,617 | A | 2/1997 | Ewald |
| 5,638,249 | A | 6/1997 | Rubino |
| 5,794,767 | A | 8/1998 | Wilson |
| 5,899,010 | A | 5/1999 | Peck |
| 6,610,382 | B1 * | 8/2003 | Kobe et al. .............. 428/119 |
| 6,640,477 | B1 | 11/2003 | Timpson et al. |
| 6,673,409 | B1 | 1/2004 | Wheatley |
| 7,125,602 | B2 | 10/2006 | Wheatley |
| 7,252,867 | B2 | 8/2007 | Wheatley |
| 2005/0271847 | A1 | 12/2005 | Antonini |
| 2006/0154029 | A1 | 7/2006 | Antonini |
| 2006/0198978 | A1 | 9/2006 | Antonini |

FOREIGN PATENT DOCUMENTS

ZA    20004637    9/2000

OTHER PUBLICATIONS

Dashmat Ultimat the revolutionary breakthorugh dashboard cover, Saddleman, Inc., 1998, 2 pages.
1999 Catalogue, Canadian Tire, 2 pages.
http://www.bracketron.com/?catid=11, Bracketron, Inc., GPS Accessories, accessed Nov. 2009, 2 pages.
http://www.bracketron.com/index.php?catied=16&pid=24, Bracketron, Inc., Nav-Mat Portable GPS Dash Mount, accessed Nov. 2009, 2 pages.
http://www.bracketron.com/?includes/phpThumb/phpThumb. php?src=../../images/_products/UFM-100-B.... Bracketron, Inc., Nav-Mat, accessed Nov. 2009, 1 page.
General Electric "Friction Pad Kit" Instructions Field Made for MPD, MPD Friction Pad, Aug. 19, 1988.
Crown Products 2002 (www.crownprod.com).
FNN-Fleet NewsNet: Company car fleet management solutions pp. 1-4, Roadtest (www.fleetnewsnet.co.uk), Jun. 8, 2004.

* cited by examiner

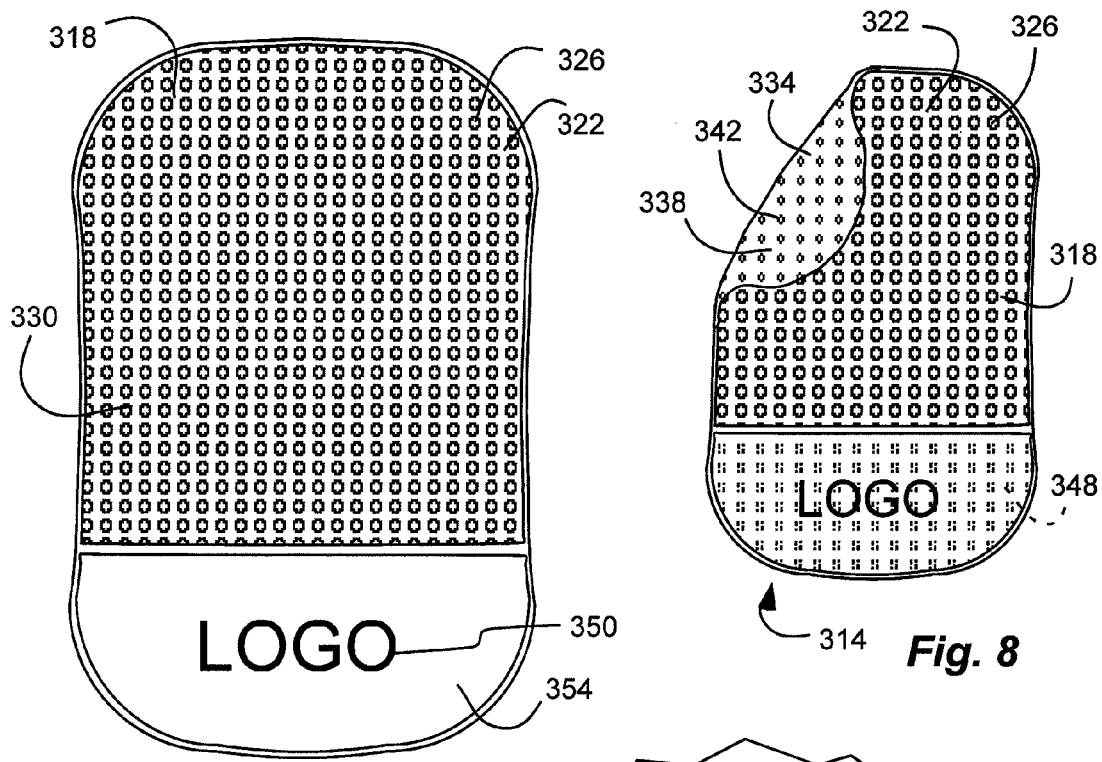
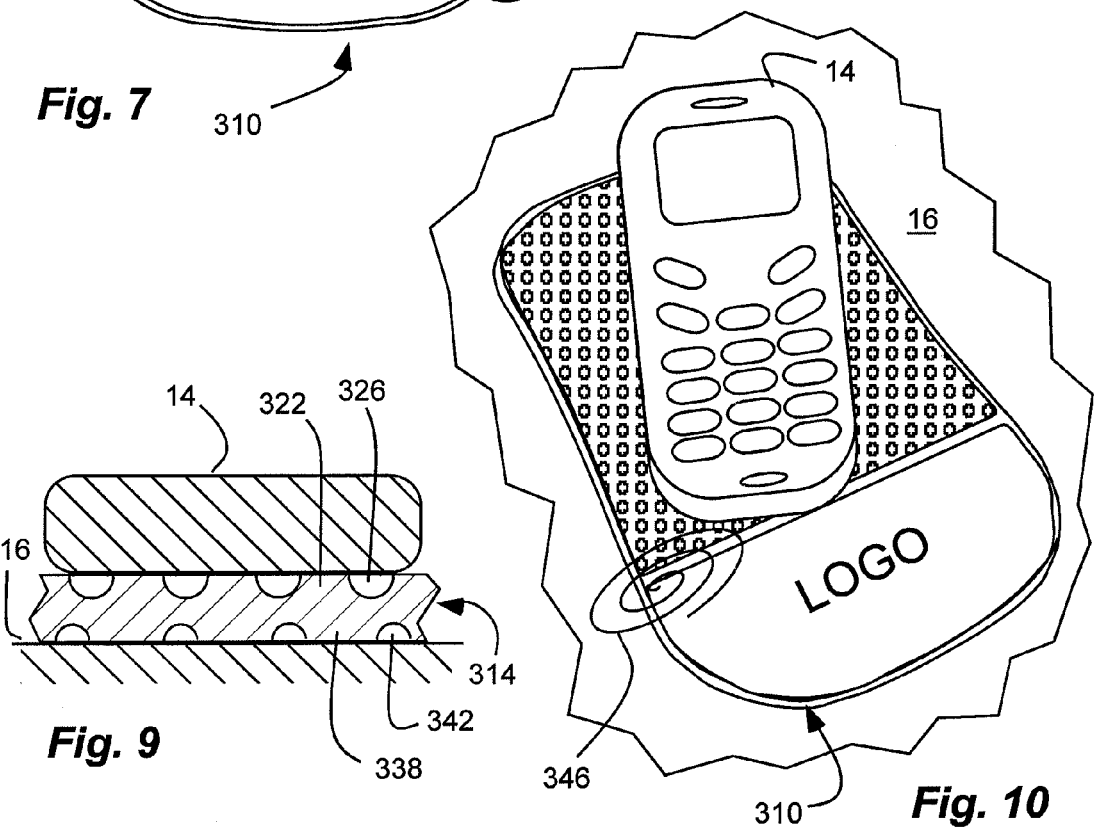

FRICTIONAL HOLDING PAD

RELATED APPLICATIONS

This is a continuation of U.S. patent application Ser. No. 11/264,669, filed Oct. 31, 2005, which is a continuation-in-part of U.S. patent application Ser. No. 11/021,560, now U.S. Pat. No. 7,252,867, filed Dec. 22, 2004; which is a continuation-in-part of U.S. patent application Ser. No. 10/684,008, now U.S. Pat. No. 7,125,602, filed Oct. 10, 2003; which is a divisional of U.S. patent application Ser. No. 10/209,948, now U.S. Pat. No. 6,673,409, filed Jul. 30, 2002; which claims benefit of U.S. Provisional Patent Application Nos. 60/308,955, filed Jul. 31, 2001, and 60/344,571, filed Dec. 28, 2001, which are all incorporated herein by reference in their entireties and for all purposes.

FIELD OF THE INVENTION

The present invention relates generally to a frictional holding pad, particularly useful to releasably secure an object, such as from movement in a vehicle.

BACKGROUND OF THE INVENTION AND RELATED ART

It is often desirable to non-permanently adhere a first object to a second object, but retain the option of removing the first object without damaging either object. Conventional adhesive devices, however, often utilize a chemical bond that is permanent in nature so that removal of the adhesive device either damages the object on which it was used, or leaves a residue on the object that is difficult to remove without damaging the object. Similarly, mechanical retaining devices often are mounted to an object in such a way as to permanently alter the object. There are also magnetic devices in which two pieces are glued to the dash and phone, and then magnetically couple together.

Additionally, many items carried in day-to-day life must often be temporarily stored to free an individual's hands for other tasks. One common example of such a situation arises when an individual enters a vehicle. Items such as cell phones, personal digital assistants, writing instruments or glasses must be stored in order to free the hands of the individual so that he or she may operate the vehicle. In many cases, however, an individual may wish to have ready access to the items should the items be quickly needed, for instance if a call is received on the cell phone. Because most vehicles involve stop-and-go or side-to-side motion, placing such items on open surfaces raises the risk that the items will slide off the open surface during operation of the vehicle. The movement of such items can cause damage to the item itself, damage to the vehicle or interior accessories, and posses a safety problem. For example, a cell phone may break if it falls to the floor, or may fall onto another object, such as a laptop computer, causing further damage. In addition, a driver may be distracted by trying to retrieve the phone from the floor. Hence, storing such items on open surfaces is generally not a viable option.

While most vehicles include storage locations for such personal items, storing the items generally requires the inconvenience of opening a compartment, such as a glove box in an automobile, and storing the items along with the other items already contained within the compartment. Once stored in such compartments, items are not visible to an individual and are not easily accessible should the individual wish to quickly access the items.

Various solutions to the problem have been proposed. Most notably, special mounting devices have been used to secure items in the car. Such mounting devices typically have a base that is secured to some object in the vehicle, and a receiving portion to receive and hold the item. For example, some devices are configured to receive and hold a cell phone. Other devices are configured to receive and hold sunglasses. One disadvantage with such mounting devices is that they are typically customized to hold a particular item, or type of item, and are ill suited for other items. For example, a mounting device for a cell phone may not adequately hold sunglasses. Thus, it may be necessary to have several mounting devices within the vehicle, one for a cell phone, one for sunglasses, one for a GPS unit, etc. One disadvantage with having several mounting devices is that the vehicle appears cluttered. In addition, such mounting devices are typically sold as accessories, and thus add expense. Another disadvantage with such mounting devices is that they can permanently alter and devalue the vehicle.

SUMMARY OF THE INVENTION

It has been recognized that it would be advantageous to develop a system and method to releasably secure items to a surface without permanently altering the surface. In addition, it has been recognized that it would be advantageous to develop a system and method to releasably secure items to a surface in a vehicle without permanently altering the vehicle surface, and allowing for ready retrieval of the object. In addition, it has been recognized that it would be advantageous to develop such a system and method capable of being used with various different items. In addition, it has been recognized that it would be advantageous to develop such a system and method capable of providing advertisement, and/or personalization or customization.

The invention provides a frictional holding device to be disposed on a vehicle surface and to receive and secure an item thereon. In accordance with one exemplary embodiment, the invention comprises a frictional holding pad with a top having an uppermost contact surface configured to contact and frictionally cling to the item, and a bottom having a lowermost contact surface configured to contact and frictionally cling to the vehicle surface. The top and the bottom are configured to provide a greater frictional engagement between the lowermost contact surface and the vehicle surface than the uppermost contact surface and the item.

In accordance with another aspect of the present invention, the size of the pad is substantially larger than the size of the item, to provide the lowermost contact surface between the vehicle surface and the pad with a substantially greater surface area than the uppermost contact surface between the item and the pad.

In yet another aspect of the invention, the top further includes a plurality of protrusions or indentations. The protrusions or indentations can comprise an array of circular indentations, each indentation having a cross-sectional profile with linear sidewalls and a flat bottom. The bottom can also include a plurality of protrusions or indentations similar to the protrusions or indentations of the top.

In accordance with another exemplary embodiment, the present invention also includes a frictional holding device in combination with a dashboard or console of a vehicle for receiving and securing an item thereon. The combination comprises the dashboard or console of a vehicle and a pad having top and bottom surfaces, where the bottom surface is disposed on and frictionally clings to the dashboard or console of the vehicle, and at least a substantial portion of the top surface is a contoured top surface with a plurality of protrusions or indentations. The top and the bottom surfaces are configured to provide a greater frictional engagement between the bottom surface and the dashboard or console of the vehicle than the top surface and the item. The combination also includes the item that is removably disposed on and frictionally clings to the top surface of the pad, which item is selected from the group consisting of: a cell phone, a personal digital assistant, a writing instrument, a pen, a pencil, sunglasses, eye glasses, a global positioning system, a radio, a two-way radio, a citizens band radio, a walkie-talkie, a camera, a video recorder, a cassette player/recorder, a mini-cassette recorder, a DVD player, a mini-disk player, and a portable television.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

FIG. 7 is a top view of another frictional holding pad in accordance with an embodiment of the present invention;

FIG. 8 is a top view of another frictional holding pad in accordance with an embodiment of the present invention shown with a corner pulled-up to reveal a bottom surface;

FIG. 9 is a detailed, partial cross-sectional side view of the frictional holding pad of FIG. 8;

FIG. 10 is a perspective view of the frictional holding pad of either of FIG. 7 or 8, shown disposed on a dashboard of a vehicle and with a cellular phone disposed thereon;

DETAILED DESCRIPTION OF EXEMPLARY EMBODIMENTS

Figure 1:
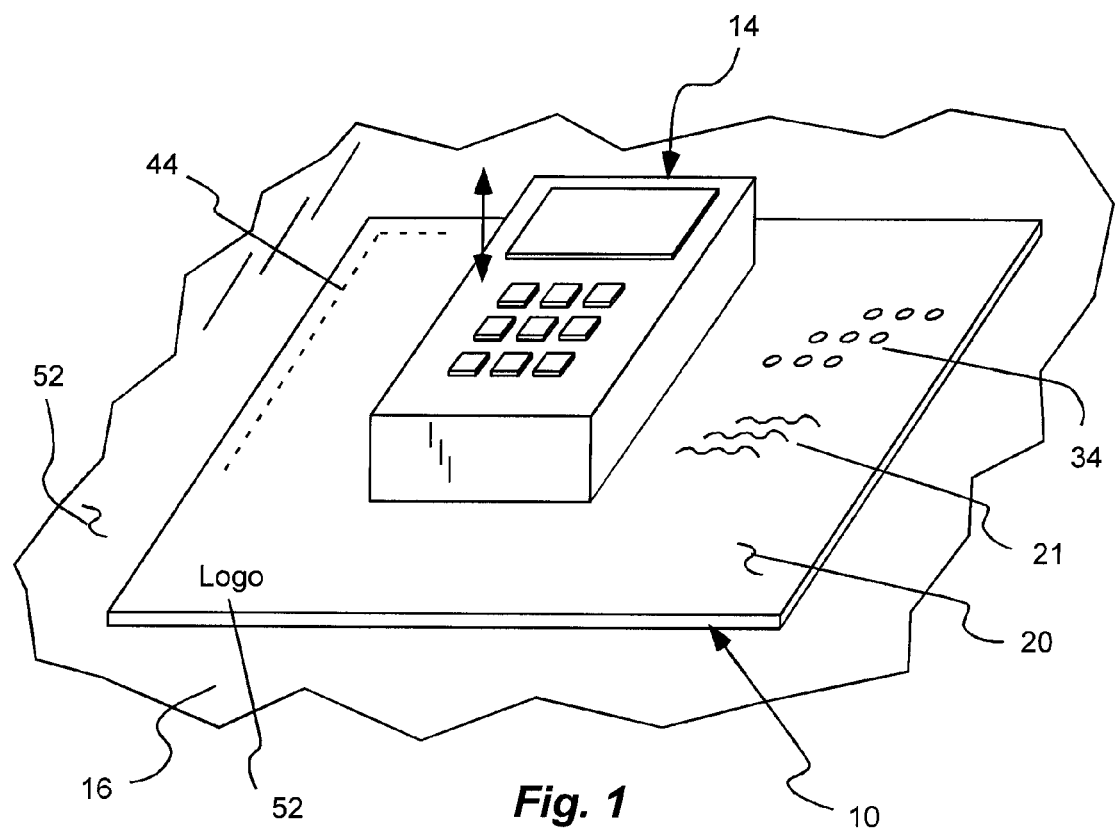
FIG. 1 is a perspective view of a frictional holding pad in accordance with an embodiment of the present invention, shown disposed on a dashboard of a vehicle and with a cellular phone disposed thereon.
Figure 2:
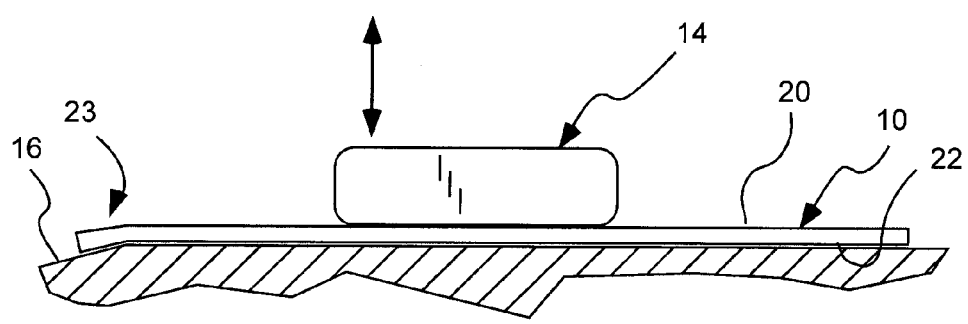
FIG. 2 is a cross-sectional view of the frictional holding pad of FIG. 1.
Figure 3:
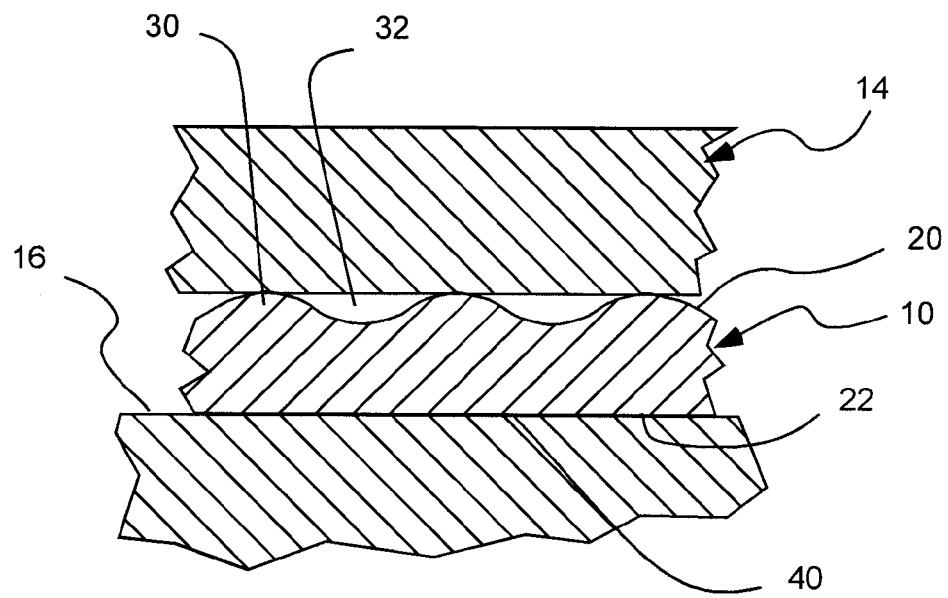
FIG. 3 is a detailed, partial cross-sectional view of the frictional holding pad of FIG. 1.
Figure 4:
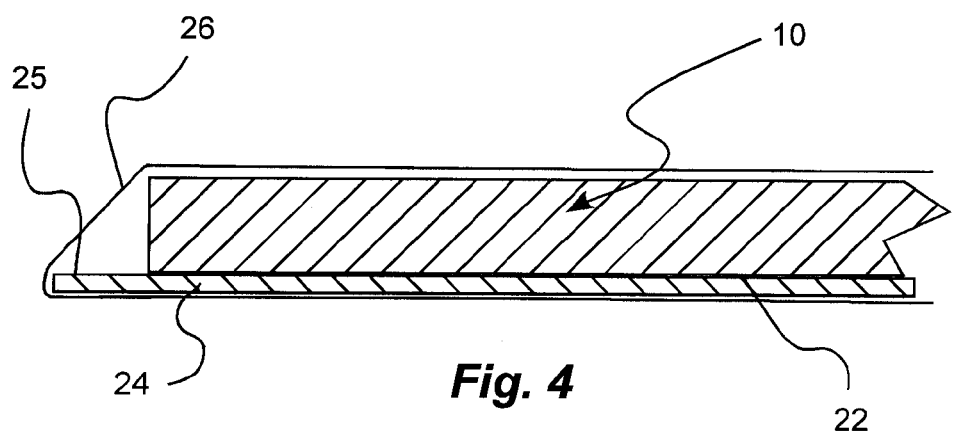
FIG. 4 is a detailed, partial cross-sectional view of the frictional holding pad of FIG. 1 with a release layer and a wrapper in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

As illustrated in FIGS. 1-5, a frictional holding pad, indicated generally at 10, in accordance with the present invention is shown for releasably retaining, or selectively maintaining, an item 14 on a surface 16. The pad 10 is disposed on the surface 16, and receives the item 14 thereon. The surface 16 can be planer or curved, and can include a dashboard or console of a vehicle. The item 14 can be any of a number of items, including for example, a cell phone, a personal digital assistant (PDA), a writing instrument, such as a pen or pencil, a pair of sunglasses, a pair of eye glasses, a global positioning system (GPS), a radio, a two-way radio, a citizens band (CB) radio, a walkie-talkie, a camera, a video recorder, a cassette player/recorder, a mini-cassette recorder, a DVD player, a mini-disk player, a portable television (TV), etc. Securing personal items in a vehicle is one field that may benefit from use of the present invention. It will be appreciated that other items can be selectively secured to the surface 16 by the pad 10. In addition, it will be appreciated that the pad can be disposed on other surfaces.

The frictional holding pad 10 has an upper or uppermost surface 20 and a lower surface 22. The upper surface 20 is holds one or more objects 14 securely in place despite movement of the surface 16 or vehicle. The lower surface 22 is disposed on and grips the surface 16. The lower surface 22 of the frictional holding pad 10 can be "tacky", such that the pad 10 tends to cling to the surface 16 in a mechanical fashion, as opposed to a chemical or adhesive manner. The lower surface 22 also can be smoother than the upper surface 20, or have a more shiny appearance.

In addition, the lower surface 22 can have a greater surface area in contact with the surface 16 to provide a greater frictional engagement. The upper surface 20 can have less surface area in contact with the object 14 to provide less frictional engagement. Thus, the pad 10 remains on the surface 16 when the object 14 is removed, rather than removing the pad from the surface while the object is removed from the pad. The upper surface 20 can have contours or texture (indicated at 21) formed thereon to reduce the surface area of the upper surface 20 in contact with the item 14 disposed thereon. Thus, the item 14 can be removed from the pad 10 without the pad sticking to the item or being removed from the surface 16.

The frictional holding pad 10 can be flexible and capable of bending (indicated at 23 in FIG. 2) to conform to curves or details in the surface 16. The frictional holding pad 10 also can have a planer configuration and can be used on planar surfaces. The frictional holding pad 10 can be provided in an original planar configuration, supported by a paper backing or release layer 24. The release layer 24 prevents or resists the pad 10 or lower surface 22 from sticking or clinging to any wrapper or packaging of the pad. The release layer 24 may be stiffer than the pad to maintain the pad in a planar configuration. In addition, the release layer 24 can include indicia thereon, such as instructions for use and care of the pad. The release layer 24 can include a tab 25 protruding therefrom beyond a perimeter of the pad 10 to facilitate removal of the release layer from the pad. Upon removal of the release layer 24, the pad 10 is flexible to enable conformity with a wide array of curved surfaces. In addition, removal of the release layer 24 exposes the lower surface 22 of the pad to be disposed on the surface 16. A removable wrapper 26 can be formed around the pad 10 and the backing layer 24 to protect the pad prior to use. The wrapper 26 and backing layer 24 can be removed prior to placing the pad on the surface 16.

The upper surface 20 of the pad 10 can be non-chemically adhered to items 14 placed thereon. Like the bottom surface 22, the upper surface 20 can be "tacky", such that the pad 10 tends to cling to the item 14 in a mechanical fashion, as opposed to a chemical or adhesive manner. As stated above, the upper surface 20 can be contoured to include protrusions 30 and/or indentations 32. The protrusions 30 and indentations 32 can be rounded or curvilinear to form a more gradual transition between the protrusions and indentations, and create a contour on the upper surface 20 that is wavy or with a more natural appearance, creating a leather-like texture that can match the surface 16. The contour of the surface 20 creates an uppermost surface on the tops of the protrusions 30 that contacts the item 14. The upper or uppermost surface 20 thus has less surface area in contact with the item 14 than the lower surface 22 has in contact with the surface 16. Thus, a greater clinging force is exerted on the item 14 than on the surfaced 16 such that the item 14 can be removed from the pad 10 or upper surface 20 without removing the pad from the surface 16. In addition, the item 14 can be smaller than the pad itself, thus also contributing to less surface contact between the upper surface 20 and the item 14.

The contour, or protrusions or indentations, can extend at least substantially across the top of the pad, as shown in FIG. 1. Thus, the contour extends into an interior region of the pad. The contoured top surface defines an item receiving area where the item can be placed. The item receiving area thus extends at least substantially across the top of the pad. The contour can be disposed on a majority of the upper surface.

Figure 5:
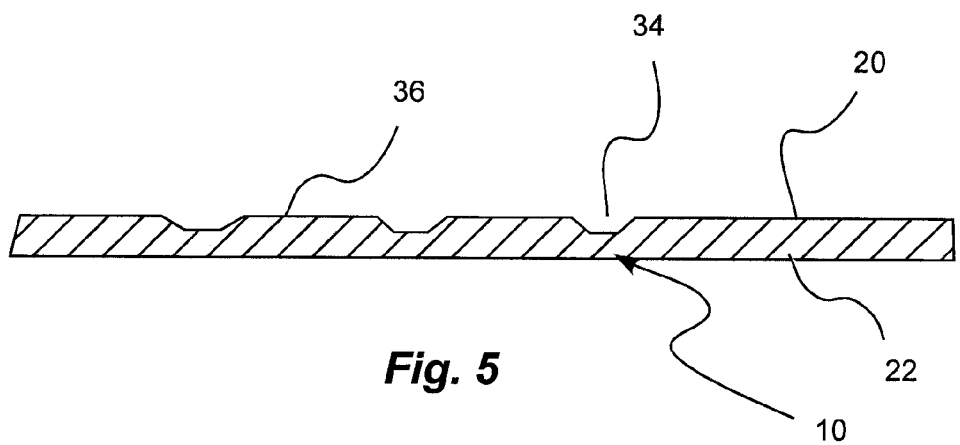
FIG. 5 is a detailed cross-sectional view of the frictional holding pad of FIG. 1.

Referring to FIG. 5, an array or matrix of a plurality of indentations 34 can be formed in the upper surface 20 of the pad 10 creating a plurality of protrusions 36 therebetween. The indentations 34 and protrusions 36 can be more straight, linear or recta-linear to create a more modern appearance.

The pad 10 can be formed of or can include an expanded vinyl material. It has been found that the expanded vinyl material provides a good frictional or "tacky" quality that remains disposed on the surface, and that retains the items thereon. In addition, it has been found that such an expanded vinyl material typically can be disposed on the surface 16 without marring or otherwise chemically interfering with the material of many surfaces, such as vehicle dashboards. It will be appreciated that many surfaces, such as a vehicle dashboard, have a finished surface configured to be aesthetically pleasing and luxurious. Such surfaces can be formed of a plastic or leather material, and can be expensive to replace or repair. In addition, it will be appreciated that some surfaces are subjected to extreme conditions, such as heat and sunlight. It has been found that the expanded vinyl material not only provides the required retention of objects and fixed relationship with the surface, but also typically does so without chemically interacting with the material of surface, or otherwise damage the surface.

The expanded vinyl material of the frictional holding pad 10 forms a temporary non-chemical bond with both 1) the items 14 stored on the upper surface 20, and 2) the surface 16. The pad 10 can be removed from the surface 16 without leaving behind any residue and without damaging the pad. In this manner the pad 10 can be easily moved to any location the user desires. Because the pad is made from expanded vinyl, it can be easily cleaned with soap and water, and still retain its tackiness, and is thus reusable.

The expanded vinyl material more specifically can include: diisodecy/phlthalate; polymeric plasticer; a UV stabilizer; a vinyl hear stabilizer; a blowing agent for vinyl plastisol; and vinyl resin (plastic). The expanded vinyl material can have a weight between approximately 10 and 20 ounces per square yard; more preferably between approximately 12 and 18 ounces per square yard; and most preferably between approximately 14 and 16 ounces per square yard. The frictional holding pad 10 can have a thickness between approximately 0.03 and 0.09; more preferably between approximately 0.04 and 0.08 inches; and most preferably between approximately 0.05 and 0.06 inches.

The frictional holding pad 10 can be formed of different layers with different materials. For example, the pad 10 can have a skin layer 40 formed on the bottom surface 22 formed of a different material than the rest of the pad. For example, the material of the skin layer 40 can include: aqua ammonia ($NH_4OH$); azardine; rubber; color; and body for thickening. The skin layer 28 can have a thickness between 0.003 and 0.006 inches, and more preferably between 0.004 and 0.005 inches.

In addition, a perforated pattern can be formed in the pad 10 to give the impression of a stitching. For example, a plurality of holes 44 can be formed around a perimeter of the pad near the edge to give the appearance of a stitched edge that can be more visually consistent with the surface 16. The pad 10 can be die cut from a larger sheet of material. The perforated pattern can similarly be formed by a die.

The frictional holding pad 10 also can include indicia 52 formed on the upper surface 20. The indicia 52 can be formed by ink, or ink-like materials, printed on the upper surface. The indicia 52 can include: a logo, an advertisement, an instruction, a promotion, a company name, and a product name. Thus, the frictional holding pad 10 can be used as a promotional item by including a business or product logo or name. It will be appreciated that such frictional holding pads can be inexpensively manufactured, and in use, can occupy a position of high and frequent visibility. Thus, such frictional holding pads can be inexpensively manufactured, and given away as promotional items. In addition, the indicia 52 can include instructions that can be related or unrelated to the use or care of the pad. For example, the instructions can include how to use or place the pad, and how to clean or wash the pad. As another example, the instructions can relate to the use of something other than the pad itself, such as an item to be disposed thereon. Thus, the pad serves dual functions, both as a frictional holding pad to secure and item, and providing ready instructions. The instructions can relate to the use of the item to be disposed thereon. Thus, such a pad can be provided with an item, or provided for use with such an item. For example, the instructions can relate to the use of a cellular phone. In addition, the indicia can include warning, such as warning not to drive while talking on the phone.

Figure 6:
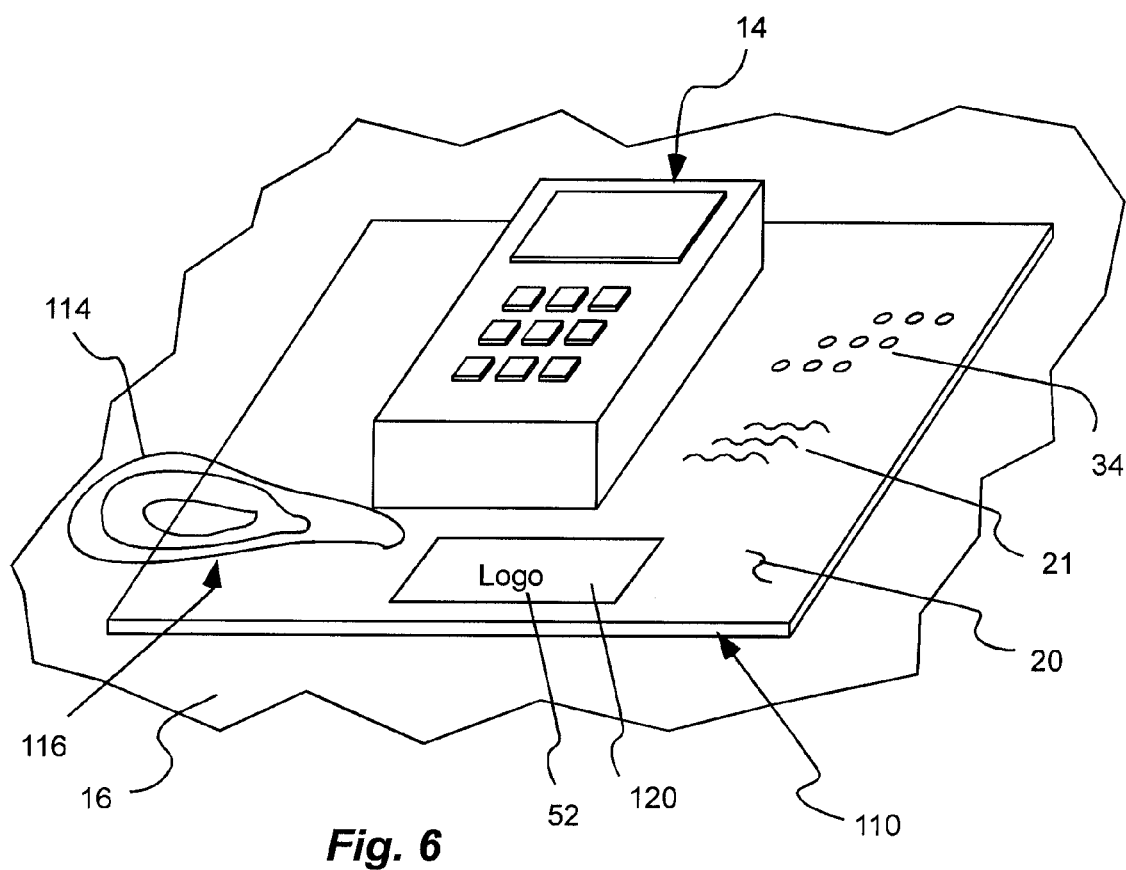
FIG. 6 is a cross-sectional view of another frictional holding pad in accordance with another embodiment of the present invention, shown disposed on a dashboard of a vehicle and with a cellular phone disposed thereon.

Referring to FIG. 6, another frictional holding pad, indicated generally at 110, is shown which is similar in many respects to the frictional holding pad described above and shown in the other drawings. The pad 110 can be translucent or transparent. Thus, surface details 114 on the surface 16 can be viewed or are visible through the pad 110 (indicated at 116 in FIG. 6). The translucent or transparent nature of the pad 110 can make the pad blend-in or match the surface 16 because of the surface details 114 showing through the pad. If the pad is translucent, it can also include a light coloring. Such coloring can help visually distinguish the pad 110 from the surface 16. Thus, a translucent pad can both blend with the surface while still being visually distinguishable therefrom.

The pad 110 can be formed of, or can include, a translucent or transparent material. For example, the pad 110 can include a molded polyurethane material. It has been found that the polyurethane material provides both a frictional or "tacky" quality that remains disposed on the surface, and that is transparent or translucent. In addition, the polyurethane material can be easily cleaned with soap and water.

The pad 110 also can include indicia 52 formed thereon. The indicia 52 can be formed on the bottom surface 22 of the pad 110 and still be visible because the pad is translucent or transparent. Forming the indicia 52 on the bottom surface 22 of the pad can also protect the indicia from wear or removal.

The pad 110 also can include a printable portion or section 120 that can include a substantially flat area on the upper surface 20. Thus, the upper surface 20 can be substantially contoured, but still have a flat printable portion or section 120 for indicia 52.

The pad 110 preferably has a low profile, or is thin, having a thickness of less than approximately 1/8th of an inch. Thus, the items 14 are kept close to the surface 16 without extending where they might interfere with the operation of the vehicle.

Thus, the pad 110 can be a thin sheet of polyurethane material with a substantially smooth and continuous lower surface 22 with a tacky characteristic to non-chemically and removably adhere to the surface 16, and a contoured upper surface 20 also with a tacky characteristic to non-chemically and removably adhere to an item. The pad or polyurethane material can be translucent or transparent, and can include printing on either the upper or lower surface.

The frictional holding pads described above can be sized and shaped to match the desired surface. For example, the pads can be sized to receive the above identified objects thereon, and to fit on typical dash boards. As an example, a size less than seven inches has been found to be useful. In addition, the pads can be sized or shaped to match other designs, such as logos.

Referring to FIGS. 7-10, other frictional holding pads 310 and 314 are shown that are similar in most respects to those described above. The frictional holding pad 314 can also include a contoured bottom surface. Referring to FIG. 7, the frictional holding pad 310 is similar to the frictional holding pad 110 shown in FIG. 6. The pad 310 has different top and bottom surfaces. The bottom surface can be substantially flat, as described above, to be disposed on the vehicle surface. Alternatively, the bottom surface can be contoured, as described below. The top surface 318 can be different from the bottom surface and can include a contoured top surface to removably receive the item. At least a substantial portion of the top surface can be the contoured top surface. The contoured top surface can include a plurality of protrusions 322 and/or indentations 326. The protrusions 322 can extend from the top surface forming the indentations 326 therebetween, or the indentations 326 can extend into the top surface forming the protrusions 322 therebetween. As discussed above, the contoured top surface can be formed by an array or matrix of indentations extending across a majority of the top surface.

Also as described above, the contoured top surface has an uppermost contact surface that is less than a lowermost contact surface the bottom surface. In addition, the contoured top surface can define an item receiving area 330 that extends at least substantially across the top or top surface 318 of the pad 310.

Referring to FIGS. 8 and 9, the bottom surface 334 also can be contoured and can include a contoured bottom surface. The contoured bottom surface includes a plurality of protrusions 338 and/or indentations 342. The protrusions and indentations of the bottom surface can be similar to those of the top surface, but can provide a lowermost contact surface to contact and frictionally cling to the vehicle surface. The lowermost contact surface of the bottom surface can have a greater surface area than the uppermost contact surface of the top. For example, the protrusions 338 of the bottom surface 334 can be larger than the protrusions 322 of the upper surface 318. Or the indentations 342 of the bottom surface 334 can be larger than the indentations 322 of the top surface 318.

As shown in FIG. 9, the protrusions 322 or 338 of the top or bottom surfaces 318 or 334 can be substantially flat, or the uppermost and lowermost contact surfaces can be flat to maximize the surface area in contact with the vehicle surface or item.

Referring to FIG. 10, either pad 310 or 314 can be translucent or transparent, or have at least a portion that is at least translucent. Thus, the vehicle surface 16 or features 346 thereof can be visible through the pad so that the pad blends-in with the vehicle surface. The pad can formed of polyurethane, which has been found to provide both tackiness and transparency/translucency, without marring most vehicle surfaces. In addition, referring to FIG. 8, the contoured bottom surface can be visible through the pad, indicated at 348, creating an interesting visual appearance.

Indicia 350 can be formed on the top surface 318 of the pad 310 or 314. The indicia can include: a logo, an advertisement, an instruction, a promotion, a company name, and a product name. The top surface 318 can include a first or flat section 354 that is flat, and upon which the indicia 350 can be disposed. In addition, the top surface 318 can include a second or remaining section that is contoured and configured to receive the item.

Figure 11:
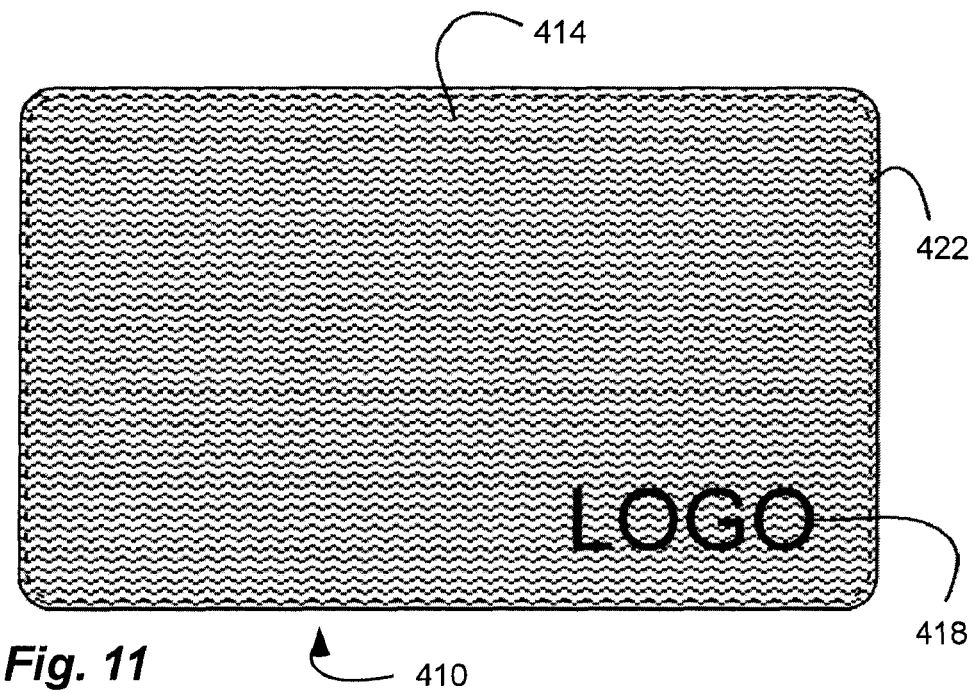
FIG. 11 is a top view of another frictional holding pad in accordance with an embodiment of the present invention.
Figure 12:
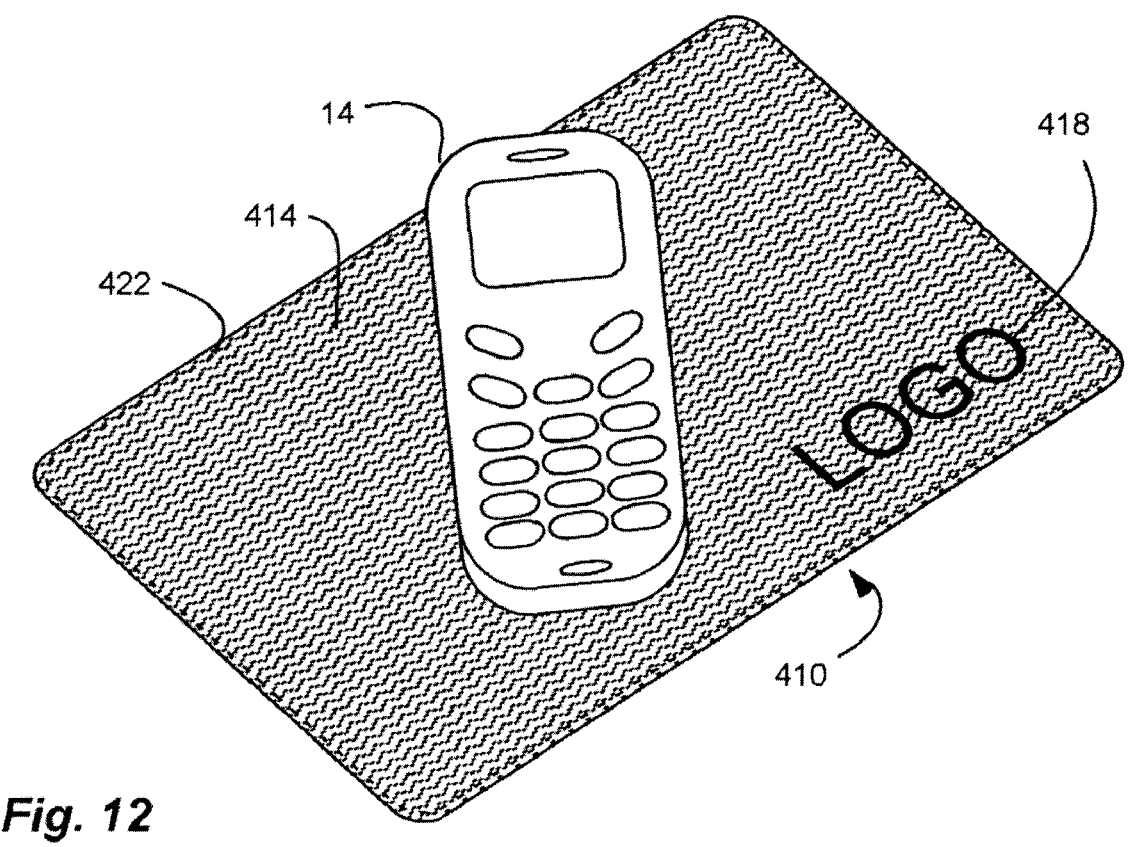
FIG. 12 is a perspective view of the frictional holding pad of FIG. 11, shown disposed on a dashboard of a vehicle and with a cellular phone disposed thereon.

Referring to FIGS. 11 and 12, another frictional holding pad 410 is shown that is similar in most respects to those described above, namely the frictional holding pad 10 of FIGS. 1-4. Again, the contoured top surface 414 can extend substantially across the top surface. The contoured top surface can include protrusion and/or indentations that are curved or wavy. The pad can be formed of an expanded vinyl material, and can have indicia 418 printed thereon. A perimeter can include holes or indentations 422 to appear as stitching or to provide a more finished looking edge.

A method for releasably securing an item on a vehicle surface without marring or altering the vehicle surface includes placing a frictional holding pad on the vehicle surface with a lowermost contact surface of the frictional holding pad contacting and frictionally clinging to the vehicle surface without marring or altering the vehicle surface. The item is placed on an uppermost contact surface of a contoured top surface of the frictional holding pad with the uppermost contact surface of the frictional holding pad frictionally clinging to the item. The uppermost contact surface can be formed by indentations and/or protrusions in the contoured top surface. The contoured top surface extends substantially across a top of the frictional holding pad. The lowermost contact surface has a greater surface area than the uppermost contact surface. The item can be removed from the uppermost contact surface of the frictional holding pad while the frictional holding pad remains on the vehicle surface. In addition, the vehicle surface can be viewed through at least a portion of the frictional holding pad that is at least translucent.

It is to be understood that the above-referenced arrangements are only illustrative of the application for the principles of the present invention. Numerous modifications and alternative arrangements can be devised without departing from the spirit and scope of the present invention while the present invention has been shown in the drawings and fully described above with particularity and detail in connection with what is presently deemed to be the most practical and preferred embodiments(s) of the invention, it will be apparent to those of ordinary skill in the art that numerous modifications can be made without departing from the principles and concepts of the invention as set forth in the claims.

What is claimed is:

1. A frictional holding device in combination with a dashboard or console of a vehicle and receives and secures an item thereon, the combination comprising:
 a) a dashboard or console of a vehicle;
 b) a pad having top and bottom surfaces, the bottom surface having a lowermost contact surface that is disposed on and frictionally clings to the dashboard or console of the vehicle;
 c) at least a substantial portion of the top surface being a contoured top surface with a plurality of separate and discrete indentations extending into the pad and having an uppermost contact surface;
 d) an item, removably disposed on and frictionally clings to the uppermost contact surface of the pad, the item is selected from the group consisting of: a cell phone, a personal digital assistant, a writing instrument, a pen, a pencil, sunglasses, eye glasses, a global positioning system, a radio, a two-way radio, a citizens band radio, a walkie-talkie, a camera, a video recorder, a cassette player/recorder, a mini-cassette recorder, a DVD player, a mini-disk player, and a portable television; and
 e) the lowermost contact surface between the dashboard or console of the vehicle and the pad has a substantially greater surface area than the uppermost contact surface between the item and the pad.

2. The combination of claim 1, wherein the plurality of indentations includes an array or matrix of circular indentations, each indentation having a cross-sectional profile with linear sidewalls and a flat bottom.

3. The combination of claim 1, further comprising the bottom surface with a plurality indentations similar to the indentations of the top surface.

4. The combination of claim 1, wherein the size of the pad is substantially larger than the size of the item to create a substantially greater contact surface area between the bottom surface and the dashboard or console of the vehicle than the top surface and the item.

5. The combination of claim 1, wherein the plurality of indentations includes an array or matrix of circular indentations, each indentation having a curved cross-sectional profile.

6. The combination of claim 1 further comprising:
 indicia, formed on the uppermost contact surface of the pad, the indicia being selected from the group consisting of: a logo, an advertisement, an instruction, a promotion, a company name, and a product name.

7. The combination of claim 1, wherein the top surface includes at least two sections, including a first section that is substantially flat and has indicia thereon, and a second section that is contoured and configured to receive the item thereon.

8. A frictional holding device in combination with a dashboard or console of a vehicle and receives and secures an item thereon, the combination comprising:
 a) a dashboard or console of a vehicle;
 b) a pad that is substantially flat and having a bottom with a lowermost contact surface that is tacky and disposed on and frictionally clings to the dashboard or console of the vehicle in a mechanical fashion without adhesive, and a top;
 c) the top having a contoured top surface that is tacky and extending over a majority of the top;
 d) the contoured top surface having a plurality of separate and discrete indentations extending into the pad and having an uppermost contact surface;
 e) an item, removably disposed on the uppermost contact surface of the pad in a mechanical fashion, the item is selected from the group consisting of: a cell phone, a personal digital assistant, a global positioning system, a radio, a two-way radio, a citizens band radio, a walkie-talkie, a camera, a video recorder, a cassette player/recorder, a mini-cassette recorder, a DVD player, a mini-disk player, and a portable television; and
 e) the lowermost contact surface between the dashboard or console of the vehicle and the pad has a substantially greater surface area than the uppermost contact surface between the item and the pad.

9. The combination of claim 8, wherein the plurality of indentations includes an array or matrix of circular indentations, each indentation having a cross-sectional profile with linear sidewalls and a flat bottom.

10. The combination of claim 8, wherein the plurality of indentations includes an array or matrix of circular indentations, each indentation having a curved cross-sectional profile.

11. The combination of claim 8, further comprising the bottom surface with a plurality of protrusions or indentations.

12. The combination of claim 8, wherein the size of the pad is substantially larger than the size of the item to create a substantially greater contact surface area between the bottom surface and the dashboard or console of the vehicle than the top surface and the item.

13. The combination of claim 8, further comprising:
 indicia, formed on the uppermost contact surface of the pad, the indicia being selected from the group consisting of: a logo, an advertisement, an instruction, a promotion, a company name, and a product name.

14. The combination of claim 8, wherein the top surface includes at least two laterally adjacent and bordering sections, including a first section that is substantially flat and has indicia thereon, and a second section that is contoured and configured to receive the item thereon.

15. A frictional holding device in combination with a dashboard or console of a vehicle and receives and secures an item thereon, the combination comprising:
 a) a dashboard or console of a vehicle;
 b) a pad that is substantially flat and having a bottom with a lowermost contact surface that is disposed on and frictionally clings to the dashboard or console of the vehicle, and a top;
 c) the top having two laterally adjacent and bordering sections, including
  a first printable section that is substantially flat and has indicia thereon, and
  a second section that has a contoured top surface;
 d) the contoured top surface having a plurality of separate and discrete indentations and having an uppermost contact surface;
 e) an item, removably disposed on the uppermost contact surface of the pad, the item is selected from the group consisting of: a cell phone, a personal digital assistant, a global positioning system, a radio, a two-way radio, a citizens band radio, a walkie-talkie, a camera, a video recorder, a cassette player/recorder, a mini-cassette recorder, a DVD player, a mini-disk player, and a portable television; and
 e) the lowermost contact surface between the dashboard or console of the vehicle and the pad has a substantially greater surface area than the uppermost contact surface between the item and the pad.

16. The combination of claim 15, wherein the plurality of indentations includes an array or matrix of circular indentations, each indentation having a cross-sectional profile with linear sidewalls and a flat bottom.

17. The combination of claim 15, wherein the plurality of indentations includes an array or matrix of circular indentations, each indentation having a curved cross-sectional profile.

18. The combination of claim 15, further comprising the bottom surface with a plurality of protrusions or indentations.

19. The combination of claim 15, wherein the size of the pad is substantially larger than the size of the item to create a substantially greater contact surface area between the bottom surface and the dashboard or console of the vehicle than the top surface and the item.

* * * * *